(12) United States Patent
Davies

(10) Patent No.: US 11,070,834 B2
(45) Date of Patent: *Jul. 20, 2021

(54) LOW-COMPLEXITY METHOD FOR GENERATING SYNTHETIC REFERENCE FRAMES IN VIDEO CODING

(71) Applicant: Cisco Technology, Inc., San Jose, CA (US)

(72) Inventor: Thomas Davies, Guildford (GB)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/938,165

(22) Filed: Jul. 24, 2020

(65) Prior Publication Data

US 2020/0359041 A1    Nov. 12, 2020

Related U.S. Application Data

(63) Continuation of application No. 15/071,778, filed on Mar. 16, 2016, now Pat. No. 10,805,627.

(60) Provisional application No. 62/241,876, filed on Oct. 15, 2015.

(51) Int. Cl.
*H04N 19/513* (2014.01)
*H04N 19/189* (2014.01)
*H04N 19/577* (2014.01)

(52) U.S. Cl.
CPC ......... *H04N 19/513* (2014.11); *H04N 19/189* (2014.11); *H04N 19/577* (2014.11)

(58) Field of Classification Search
CPC ... H04N 19/513; H04N 19/189; H04N 19/577
See application file for complete search history.

(56) References Cited

U.S. PATENT DOCUMENTS

| | | |
|---|---|---|
| 4,703,350 A | 10/1987 | Hinman |
| 5,926,225 A | 7/1999 | Fukuhara et al. |
| 6,205,177 B1 | 3/2001 | Girod et al. |
| 6,249,318 B1 | 6/2001 | Girod et al. |
| 6,560,284 B1 | 5/2003 | Girod et al. |
| 6,650,284 B1 | 5/2003 | Girod et al. |
| 6,807,231 B1 | 10/2004 | Wiegand et al. |
| 6,809,231 B2 | 10/2004 | Wiegand et al. |
| 6,816,552 B2 | 11/2004 | Demos |
| 7,154,952 B2 | 12/2006 | Tourapis et al. |
| 7,266,150 B2 | 9/2007 | Demos |
| 7,310,373 B2 | 12/2007 | Kondo et al. |
| 7,515,635 B2 | 4/2009 | Hagai et al. |

(Continued)

OTHER PUBLICATIONS

Shevtsov, Maxim et al., "Intro to Advanced Motion Estimation Extension for OpenCL™", Dec. 4, 2014, 14 pages.

(Continued)

*Primary Examiner* — Boubacar Abdou Tchoussou
(74) *Attorney, Agent, or Firm* — Edell, Shapiro & Finnan, LLC

(57) ABSTRACT

Presented herein are techniques for a low-complexity process of generating an artificial frame that can be used for prediction. At least a first reference frame and a second reference frame of a video signal are obtained. A synthetic reference frame is generated from the first reference frame and the second reference frame. Reference blocks from each of the first reference frame and the second reference frame are combined to derive an interpolated block of the synthetic reference frame.

20 Claims, 9 Drawing Sheets

(56) References Cited

U.S. PATENT DOCUMENTS

| | | |
|---|---|---|
| 7,542,510 B2 | 6/2009 | Kadono et al. |
| 7,599,437 B2 | 10/2009 | Chujoh et al. |
| 8,009,733 B2 | 8/2011 | Hagai et al. |
| 8,139,638 B2 | 3/2012 | Demos |
| 8,144,774 B2 | 3/2012 | Demos |
| 8,160,142 B2 | 4/2012 | Demos |
| 8,170,102 B2 | 5/2012 | Bhaskaran et al. |
| 8,213,507 B2 | 7/2012 | Demos |
| 8,218,639 B2 | 7/2012 | Bjontegaard |
| 8,290,043 B2 | 10/2012 | Demos |
| 8,305,500 B2 | 11/2012 | Cheng et al. |
| 8,325,809 B2 | 12/2012 | Demos |
| 8,363,721 B2 | 1/2013 | Tian et al. |
| 8,401,078 B2 | 3/2013 | Demos |
| 8,488,674 B2 | 7/2013 | Demos |
| 8,654,855 B2 | 2/2014 | Kim et al. |
| 8,660,175 B2 | 2/2014 | Dane et al. |
| 8,774,279 B2 | 7/2014 | Kim et al. |
| 8,873,629 B2 | 10/2014 | Demos |
| 8,873,632 B2 | 10/2014 | Demos |
| 8,953,685 B2 | 2/2015 | Dane et al. |
| 8,971,412 B2 | 3/2015 | Ye et al. |
| 9,036,709 B1 | 5/2015 | Kim et al. |
| 8,934,544 B1 | 7/2015 | Wang |
| 9,351,013 B2 | 5/2016 | El-Maleh et al. |
| 9,357,228 B2 | 5/2016 | Au et al. |
| 9,473,778 B2 | 10/2016 | Chou et al. |
| 9,781,382 B2 | 10/2017 | Zhang et al. |
| 10,021,392 B2 | 7/2018 | Puri |
| 2004/0005004 A1 | 1/2004 | Demos |
| 2005/0105615 A1 | 5/2005 | El-Maleh et al. |
| 2006/0017843 A1 | 1/2006 | Shi et al. |
| 2007/0140338 A1 | 6/2007 | Bhaskaran et al. |
| 2007/0211800 A1 | 9/2007 | Shi et al. |
| 2009/0148058 A1 | 7/2009 | Dane et al. |
| 2009/0167775 A1 | 7/2009 | Lu et al. |
| 2009/0310682 A1 | 12/2009 | Chono |
| 2010/0092101 A1 | 4/2010 | Liang et al. |
| 2011/0170605 A1 | 7/2011 | Sato et al. |
| 2011/0211111 A1 | 9/2011 | Mishima et al. |
| 2011/0249188 A1 | 10/2011 | Cheng et al. |
| 2011/0255610 A1 | 10/2011 | Kameyama et al. |
| 2011/0293012 A1 | 12/2011 | Au et al. |
| 2012/0294367 A1 | 11/2012 | Ziauddin et al. |
| 2015/0036737 A1 | 2/2015 | Puri et al. |
| 2015/0092855 A1 | 4/2015 | Chou et al. |
| 2015/0124886 A1 | 5/2015 | Kim et al. |
| 2015/0201150 A1 | 7/2015 | Kimura et al. |
| 2015/0264385 A1 | 9/2015 | Ogawa |
| 2015/0319442 A1 | 11/2015 | Puri |

OTHER PUBLICATIONS

International Search Report and Written Opinion in counterpart International Application No. PCT/US2016/056516, dated Dec. 6, 2016, 10 pages.

Zhai, et al., "A Low Complexity Motion Compensated Frame Interpolation Method," IEEE International Symposium on Circuits and Systems (ISCAS 2005), May 2005, pp. 4927-4930.

Kamp, et al., "Decoder Side Motion Vector Derivation for Inter Frame Video Coding," IEEE International Conference on Image Processing (ICIP 2008), Oct. 2008, 4 pages.

US 11,070,834 B2

LOW-COMPLEXITY METHOD FOR GENERATING SYNTHETIC REFERENCE FRAMES IN VIDEO CODING

CROSS REFERENCE TO RELATED APPLICATION

This application is a continuation of U.S. patent application Ser. No. 15/071,778, filed Mar. 16, 2016, which in turn claims priority to U.S. Provisional Patent Application No. 62/241,876, filed Oct. 15, 2015. The entirety of each of these applications is incorporated herein by reference.

TECHNICAL FIELD

The present disclosure relates to video coding and decoding.

BACKGROUND

One task of video coding is producing a good and reliable prediction of a video frame. Reference frames can be taken from a set of previously coded frames and used to predict data of a current frame. Sometimes in high motion sequences, reference frames are not good predictors due to the large amount of motion between frames. Temporal interpolation techniques can be used to create better reference frames, but such methods can be very complex.

DESCRIPTION OF EXAMPLE EMBODIMENTS

Overview

Presented herein are techniques for a low-complexity process of generating an artificial (synthetic) reference frame that can be used for prediction. Low complexity is important as it is necessary for a decoder to follow exactly the same process as the encoder to produce the new reference data, and such decoders may operate on low power devices.

In accordance with one embodiment, the process involves obtaining at least a first reference frame and a second reference frame of a video signal, and a synthetic reference frame is generated from the first reference frame and the second reference frame. The synthetic reference frame is generated by several operations. First, the synthetic reference frame is divided into a plurality of blocks. Next, a search is made for motion vectors in the first reference frame and the second reference frame for each of the plurality of blocks in the synthetic reference frame. Motion vector information is derived for each of the plurality of blocks in the synthetic reference frame from motion vectors identified in each of the first reference frame and the second reference frame. Reference blocks in each of the first reference frame and the second reference frame are identified using the motion vector information for each of the plurality of blocks in the synthetic reference frame. Reference blocks from each of the first reference frame and the second reference frame are combined to derive an interpolated block of the synthetic reference frame.

DETAILED DESCRIPTION

A frame interpolation process is provided for video encoding applications. The approach is based on block matching motion estimation. This method works for any temporal position between two reference frames. This method can also be applied in the case of motion extrapolation i.e. both reference frames lie on the same side of the frame to be created.

Frame Weighting

Figure 1:
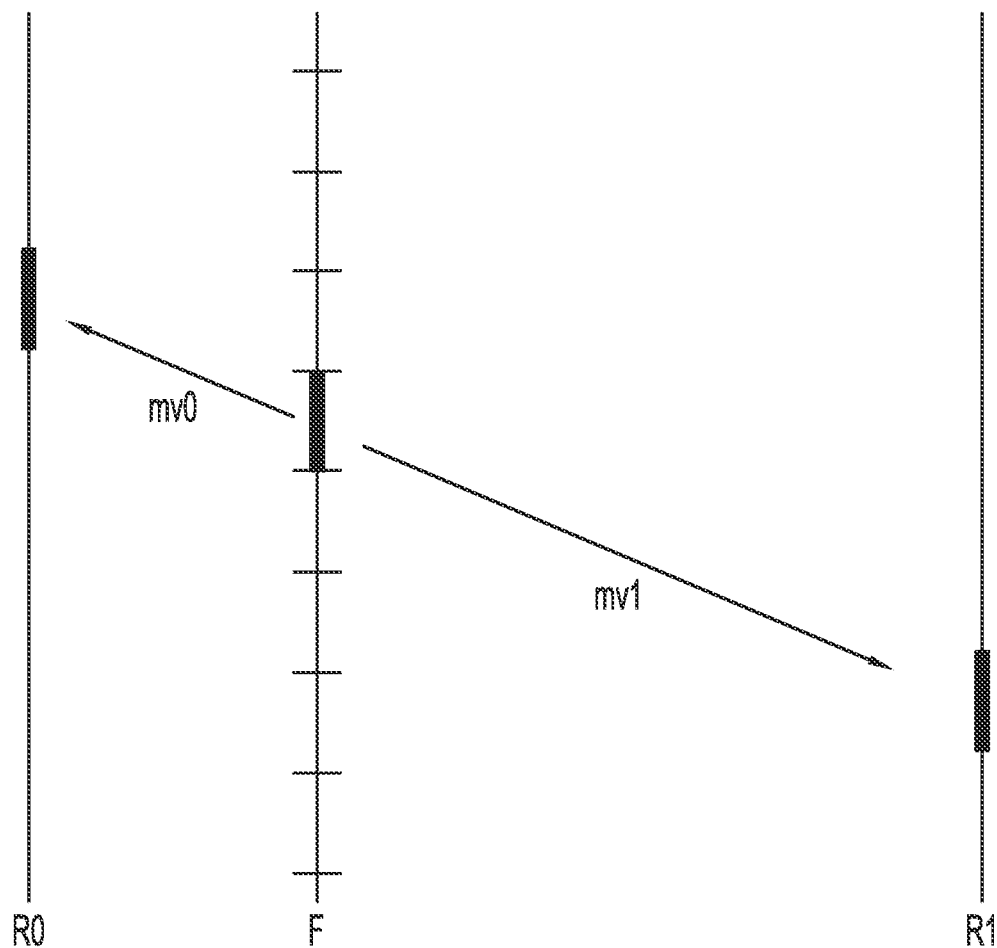
FIG. 1 is a diagram depicting a motion estimation process according to an example embodiment.

Reference is first made to FIG. 1. FIG. 1 depicts an interpolated video frame F with respect to two reference frames R0 and R1. The temporal position of the interpolated frame F with respect to two reference frames R0 and R1 is determined by two integer weights W0 and W1. These weights are proportional to the relative linear weights of R0 and R1 in the interpolation i.e. the distance between F and R1 and F and R0 respectively (note the order). The temporally nearer frame has a larger weight and the temporally farther frame a smaller weight. Interpolated reference F is also referred to herein as a synthetic reference frame.

The references are arranged so that R1 is always at least as far away as R0, i.e. W0>=W1.

When interpolated frame F is equidistant from R0 and R1, both weights are of course one. This is always the case when this process is used to provide an interpolated reference in hierarchical B frame coding.

Scaling Motion Vectors

The frame F to be interpolated is divided into blocks, such as 16×16 blocks, each composed of 4 8×8 sub-blocks. FIG. 1 shows a block at reference numeral 5, as an example, but as shown in FIG. 1, there are numerous blocks in frame F, and again, each block is divided into sub-blocks (not shown in FIG. 1). Block 5 is also referred to herein as an interpolated block of the synthetic/interpolated reference frame F. Motion vectors mv0 and mv1 are associated with each 8×8 sub-block. Larger block/sub-block sizes may be used, for example with higher resolution video, or smaller block/sub-block sizes, for example with lower resolution video, with no change to the methodology. The primary motion vector is mv1, as this will retain more accuracy, and the secondary motion vector mv0 is derived from the primary motion vector mv1 by scaling down the primary motion vector mv1 to get the appropriate scale:

$$mv0.x=-\text{sign}(mv1.x)*((\text{abs}(mv1.x*w1)+(w0/2))/w0)$$

$$mv0.y=-\text{sign}(mv1.y)*((\text{abs}(mv1.y*w1)+(w0/2))/w0)$$

The computations use integer division, but with a number of sub-pixel accuracy bits applied to the motion vectors (such as 3 bits). This is for the purpose of scaling motion vectors accurately: the interpolation process itself is only pixel-accurate and rounds these motion vectors to pixel accuracy for motion estimation and interpolation. In other words, the primary motion vector is determined to pixel accuracy and the secondary motion vector is rounded to achieve a same level of accuracy as the primary motion vector.

The model is therefore a linear one. For a frame halfway between R0 and R1 (as in hierarchical B-frame coding), mv0=−mv1. The goal of motion estimation is for each block B to find a good match between B+mv0 in reference frame R0 and B+mv1 in reference frame R1. This is shown in FIG. 1.

The method presented herein involves pulling motion vector information into the frame to be created rather than pushing forward blocks from reference frames. An array of pixels is defined that corresponds to the synthetic/virtual reference frame to be created. That synthetic reference frame is divided that into blocks, and then into sub-blocks. A search is made of motion vectors in the two reference frames (usually on either side) and information from those two reference frames is incorporated into each of the blocks of the synthetic reference frame.

The secondary motion vector is derived from the primary motion vector by scaling down the primary motion vector to an appropriate scale. Searching is conducted in matched areas in the two reference frames and an average of the matched blocks is inserted into that block area of the synthetic reference frame. This is a distinction from how temporal interpolation is currently performed. Current techniques involve taking a block in reference frame R0 and matching it to a block in reference frame R1, and deriving a motion vector for the entire distance from R0 to R1, and then scaling that down to a position in the middle. Thus, in the current techniques, the grid (of blocks and sub-blocks) is not in the synthetic reference frame to be created but is instead is in the existing reference frame and this information is pushed forward or pulled back from one reference frame to the other frame. As a result, current techniques would produce gaps where the motion vectors diverge or overlaps where the motion vectors converge. The present method does not create overlaps or gaps. Every block in the synthetic reference frame to be created is filled by obtaining pairs of corresponding blocks from the reference frames. Again, this method involves creating a synthetic reference frame as part of video compression (using a "pull" operation rather than a "push" operation).

To summarize, the plurality of blocks are divided into a plurality of sub-blocks, and searching for motion vectors involves identifying, for each sub-block, a primary motion vector in a farther one of the first and second reference frames. The secondary motion vector in a nearer one of the first and second reference frames is derived from the primary motion vector by scaling the primary motion vector to an appropriate scale. Moreover, searching may involve matching a block or sub-block in the farther one of the first and second reference frames obtained by displacing a corresponding block from the synthetic reference frame by the primary motion vector, with a block or sub-lock in the nearer one of the first and second reference frames obtained by displacing the same block in the synthetic reference frame by the secondary motion vector.

Motion Estimation

The purpose of the motion estimation process is to find a primary motion vector mv1, and its associated scaled secondary motion vector mv0, for each sub-block.

The approach is hierarchical. The reference frames R0 and R1 are repeatedly scaled down by a factor ½ vertically and horizontally using a (½,½) half-band filter to form reference frames R0(n), R1(n) of size width/$2^n$×height/$2^n$. Motion vectors from the previous (lower) layer are available as search candidates for the next layer, as are spatial neighbors from the same layer which have already been chosen. The block sizes are the same at each layer, so each block at layer n+1 corresponds to 4 blocks in the layer above (i.e. level n).

An advantage of hierarchical motion estimation is that when scanning blocks in raster order, candidate vectors corresponding to blocks to the right and below the current block can be added to the search from the layer below, as well as candidates from the left and above from the current layer. This allows the motion estimation algorithm to adjust to discontinuities in the motion field.

For each layer, the stages are as follows:
1. For each 16×16 block in raster order:
   a. Determine if motion estimation (ME) can be bypassed (i.e., skipped entirely).
   b. If not bypassed, determine candidates from lower layer blocks and from neighbor blocks in raster order.
   c. Perform an adaptive cross search around each candidate vector and determine the best vector amongst all those searched for each block.
2. For each 8×8 block in raster order, find the best merge candidate, i.e. choose which motion vector to use: the original 16×16 block vector, or one of the neighboring block vectors. In other words, for each of the sub-blocks in raster order, a best merge candidate motion vector is determined from either a motion vector of an original block of which a given sub-block is a part or one of the motion vectors of one of neighboring sub-blocks to the given sub-block. This is useful when adjusting a search of motion boundaries where a foreground meets a background object, in deciding whether each sub-block is in the foreground or background.

In step 1c above, the ranges of the cross search may be restricted to just 2 steps (maximum 8 matches) if the search is not at the lowest resolution layer. This is because vector candidates from the lower layer or from neighbors will already be highly accurate by this point.

Figure 2:
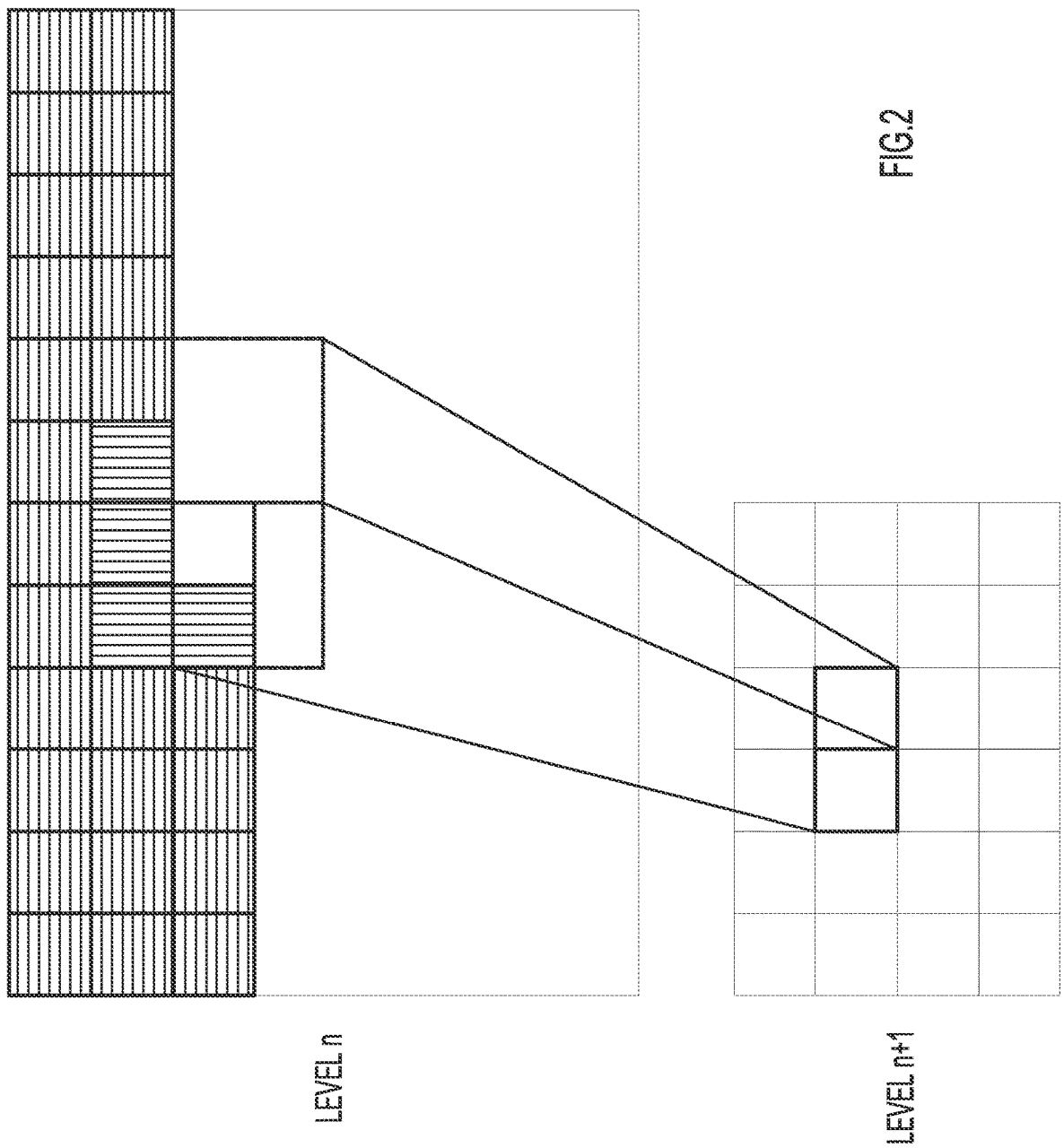
FIG. 2 illustrates a hierarchical motion estimation process according to an example embodiment.

FIG. 2 illustrates a hierarchical motion estimation process whereby candidates for estimating the motion of a block at level n of the frame hierarchy may use candidates either from previously estimated blocks at the current level (horizontal cross-hatched blocks), particularly the immediate neighbors (vertical cross-hatched blocks) or may use scaled motion vectors from blocks from level n+1, usually in the collocated region or its environs.

Performing the same process at multiple scales reduces complexity, and results in a better motion field. In other words, the process starts with smaller pictures and downsamples reference frames, divides those reference frames into blocks (e.g., 16×16 blocks), and obtains a motion field as described herein. Then, the process proceeds to pictures that are 4-times as large and motion vectors at level n are used for level n+1. Thus, this is hierarchical in terms of resolution, starting with small pictures and using that to guide motion vectors in larger pictures. This allows the process to look ahead (instead of in raster scan order where can only look at vectors above and left) down and to the right. There are numerous estimation algorithms, now known or hereinafter developed, that can be used at any given resolution layer.

Bypass Prediction

Bypass prediction is used to stabilize the motion vector field (i.e., prevent accidental matches) and reduce complexity. A skip vector mv1 is computed from neighboring blocks (or a default value such as (0,0)) is used. The scaled vector mv0 is determined as above.

Given a luma block B in the interpolated frame F, a value is computed for each 8×8 sub-block S of block B. This is the sum-absolute difference (SAD) between S+mv0 in R0 and S+mv1 in R1. Likewise the SAD for the corresponding chroma sub-blocks is also computed, using scaled motion vectors if the chroma is subsampled (e.g. with 420, both x and y coordinates must be halved). If these SADs are all below a given threshold for each then further motion is bypassed (not performed).

The skip vector and the skip threshold could both be transmitted from the encoder to a decoder to constrain complexity. In one embodiment, the skip vector is computed from up to 3 neighboring blocks as the vector with the smallest total distance from the other 2 vectors.

To summarize, a skip vector is computed for a given block from neighboring blocks or from a default value. A determination is made as to whether or not the skip vector is valid (has a small error) based on a value computed for each sub-block of the given block, and if so, there is no need to perform do any further motion estimation (motion estimation can be bypassed). Again, a skip vector is used to determine whether to bypass motion estimation.

Candidate Derivation

The candidates for motion estimation searching of a block at position (p,q) (in units of 16×16 blocks) consist of:
1. Vectors from the guide motion vector arrays at positions corresponding to some or all of the positions (p,q), (p,q+1), (p+1,q) and (p+1,q+1).
2. Vectors from neighboring blocks corresponding to some or all of the positions (p−1,q), (p−1,q−1), (p,q−1) and (p+1,q−1).

Said another way, in motion vector candidate derivation, spatial neighbors above and to the left, guide vectors in the co-located lower layers and also down and to the right are used.

The main guide motion vector array is the array of motion data formed from performing motion estimation at the next smaller size in the hierarchical scheme, with data scaled to compensate for the different reference resolution and number of blocks. For example, a vector (x,y) at position (m,n) would provide a guide vector (2x,2y) at positions (2m,2n), (2m+1,2n)(2m,2n+1), (2m+1,2n+1).

If multiple frames are being interpolated at different positions between R0 and R1 then multiple guides can be derived at the same spatial resolution by scaling the motion vectors to compensate for the different temporal positions i.e. the different temporal distances to the references. For example if a motion field at position 4 between R0 and R1 at positions 0 and 8 had been determined, a guide motion field can be determined for position 2 or 6 by multiplying one set of motion vectors by 0.5 and multiplying the other set by 1.5, as these are new relative distances to the reference frames. In other words, Thus, in interpolating a number of frames between reference frames, a number of guide motion vector fields can be determined both from hierarchical layers for the current frame and by scaling motion fields from all the previously interpolated frames in the set.

Block Matching Search

Given a set of candidates, an adaptive cross search is performed for each candidate to find the best motion vector associated to each candidate, and the best result selected from these candidates.

A displacement D is maintained along with a current best MV my best. 4 positions in a cross shape are evaluated:

$(mv\_best.x+D, mv\_best.y)$ $(mv\_best.x-D, mv\_best.y)$ $(mv\_best.x, mv\_best.y+D)$ $(mv\_best.x, mv\_best.y-D)$ If any of these are better than the cost for my best, then my best is set to this vector. Otherwise, the displacement D is halved.

In this process, the total number of block matches for all candidates is also limited. The displacement D is set to be just 1 pixel except at the lowest layer. The number of matches allowed is 8 except at the lowest layer (usually just 1 or 2 blocks), where it is 64. These constraints help lower complexity and enforce motion coherence.

Figure 3:
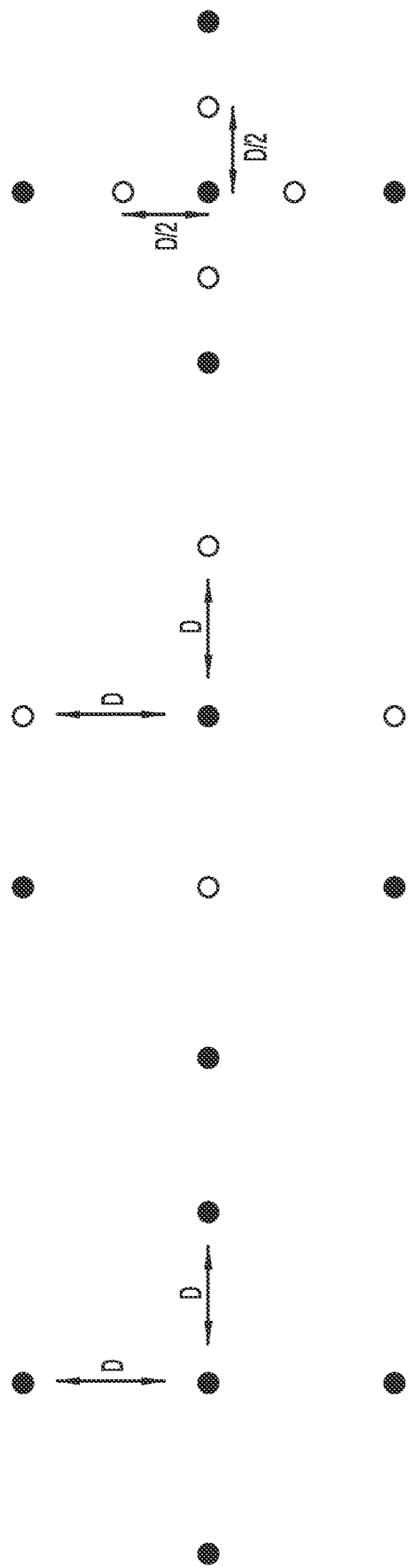
FIGS. 3A-3C illustrate examples of cross searching operations according to an example embodiment.

FIG. 3A shows the basic matching positions in each iteration of the cross search. FIG. 3B shows the pattern of new matches in the next iteration if one of the 4 neighbor positions is chosen. FIG. 3C shows the pattern of new matches in the next iteration if the current center position is maintained.

The matching criterion is (in the case of 420 video):

$SAD(B0,B1)+4*(SAD(U0,U1)+SAD(V0,V1))+$ lambda*$mv\_cost$ or $SAD(B0,B1)+$lambda*$mv\_cost$ where B0=B+mv0 in the luma plane of R0, B1=B+mv1 in the luma plane of R1; U1 is the corresponding block in the U plane of R1 (i=0,1); V1 is the corresponding block in the V plane of R1 (i=0,1). lambda is set to a fixed value for each layer. The luma only cost may be used to reduce complexity further. mv_cost is a measure of the disparity between the motion vector and previously determined neighboring vectors.

Merging

Figure 4:
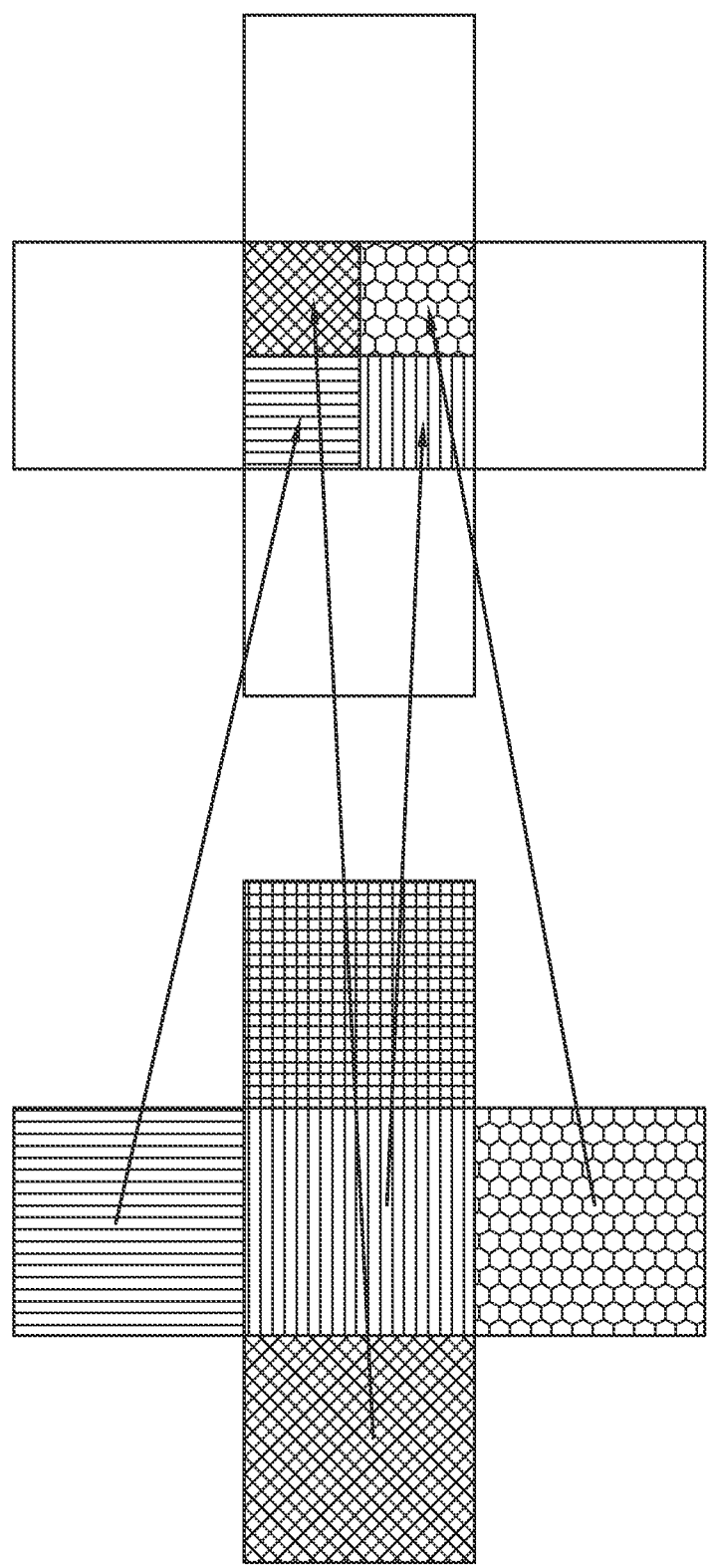
FIG. 4 is a diagram illustrating a merge operation of the motion estimation process, according to an example embodiment.

An additional motion estimation stage occurs at the 8×8 sub-block size. For each 8×8 sub-block within a 16×16 block, the 5 candidates are formed from the current 16×16 motion vector and the 4 16×16 neighbors above, left, right and below (note that this is not the same as the 4 8×8 neighbors. FIG. 4 shows an example, where the shading indicates which motion vector is selected for the 8×8 sub-blocks in the center right from the 5 candidates shown on the left. The best SAD cost is computed and the new motion vector is used. In most cases, these SAD costs would already have been computed at the 16×16 level, as these vectors are likely to have been candidates, so if the SAD function recorded low costs at a 8×8 sub-block, new SAD costs need to be calculated.

Motion Compensation

Having determined a motion vector mv1 for each block, and the corresponding scaled vector mv0, an interpolated block is generated by combining reference blocks from each of the first reference frame R0 and second reference frame R1. The combining may use a weighted average of the reference blocks in R0 and R1, using weights w0 and w1. In an equidistant case, this is a simple average. The weighting may be unequal weighting or equal weighting.

This is a normal case, where both vectors point to regions within the reference pictures. Unidirectional prediction may be used if just one reference is valid, and edge-extension is also applied.

Figure 5:
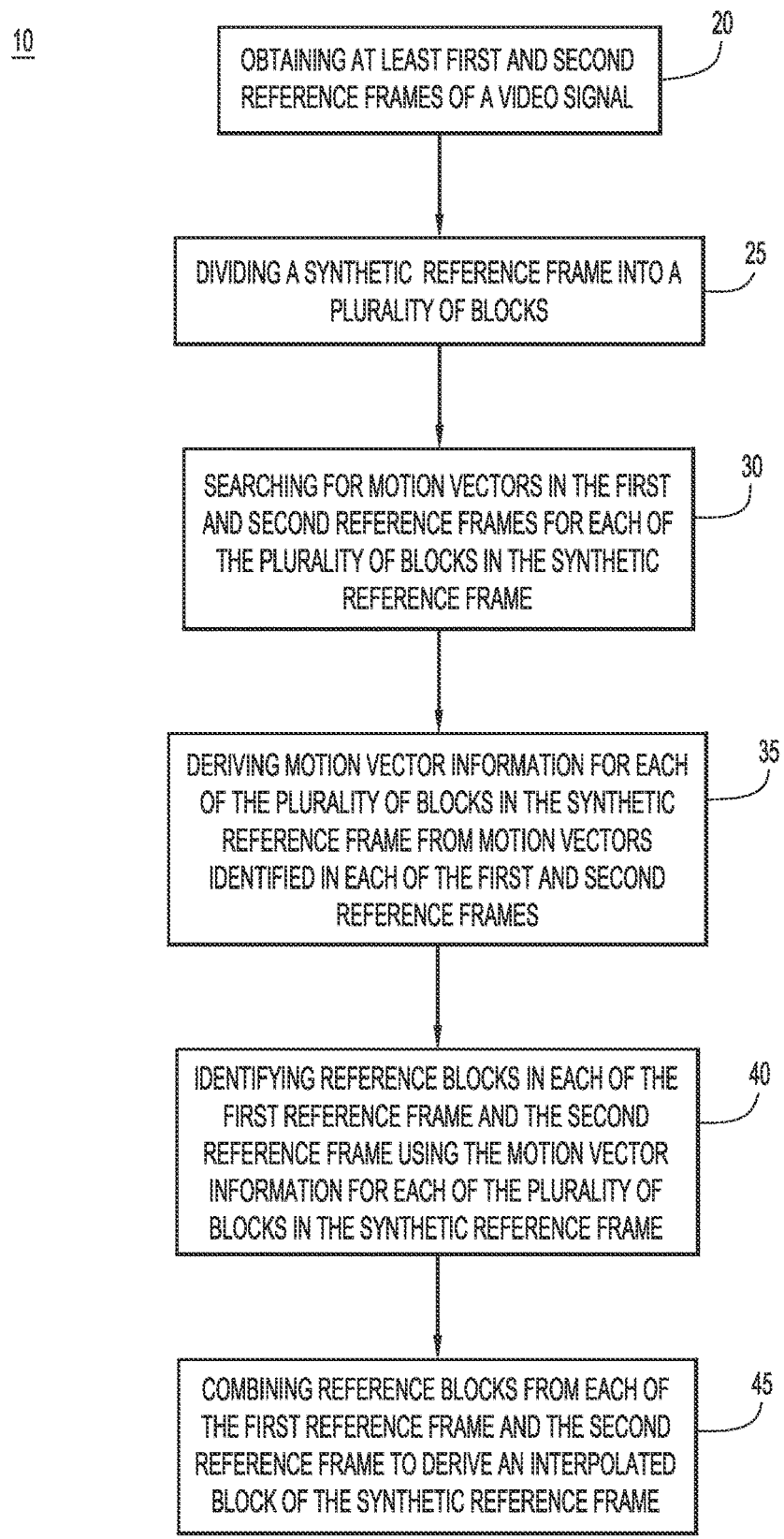
FIG. 5 is a flow chart generally depicting a process for generating a synthetic reference frame according to the techniques presented herein.

Reference is now made to FIG. 5. FIG. 5 illustrates a flow chart for a process 10 according to the techniques described herein. Reference is also made to FIGS. 1-4 for purposes of this description. This process is performed at a video encoder and at a video decoder. At 20, at least first and second reference frames of a video signal are obtained. Steps 25-45 involve generating a synthetic reference frame from the first reference frame and the second reference frame. Specifically, at 25, the synthetic reference frame is divided into a plurality of blocks. Then, the goal of steps 30-45 is to interpolate respective ones of the plurality of blocks (called interpolated blocks hereinafter) of the synthetic reference frame based on reference blocks in the first reference frame and the second reference frame. At 30, a search is made for motion vectors in the first reference frame and the second reference frame for each of the plurality of blocks in the synthetic reference frame. At 35, motion vector information for each of the plurality of blocks in the synthetic reference frame is derived from motion vectors identified in each of the first and second reference frames.

As described above, a temporal position of the synthetic reference frame with respect to the first and second reference frames is determined by integer weights that are proportional to a distance between the synthetic reference frame and the first and second reference frames, respectively, such that a nearer reference frame temporally has a larger weight.

At 40, reference blocks in each of the first reference frame and the second reference frame are identified using the motion vector information (derived in step 35) for each of the plurality of blocks in the synthetic reference frame. At 45, reference blocks from each of the first reference frame and the second reference frame are combined to derive an interpolated block of the synthetic reference frame. Thus, the operations of steps 30-45 are performed repeatedly so as to interpolate all (or a select subset) of the plurality of blocks (i.e., interpolated blocks) of the synthetic reference frame.

As explained above, the combining operation of step 45 may include averaging the reference blocks from each of the first reference frame and the second reference frame. The averaging may be an unweighted averaging or a weighted averaging. When weighted averaging is employed, integer weights are used which are proportional to a distance between the synthetic reference frame and the first reference frame, and a distance between the synthetic reference frame and the second reference frame.

The decoder has to create same references as the encoder. As a result, the same process is performed at the encoder as at the decoder.

Figure 6:
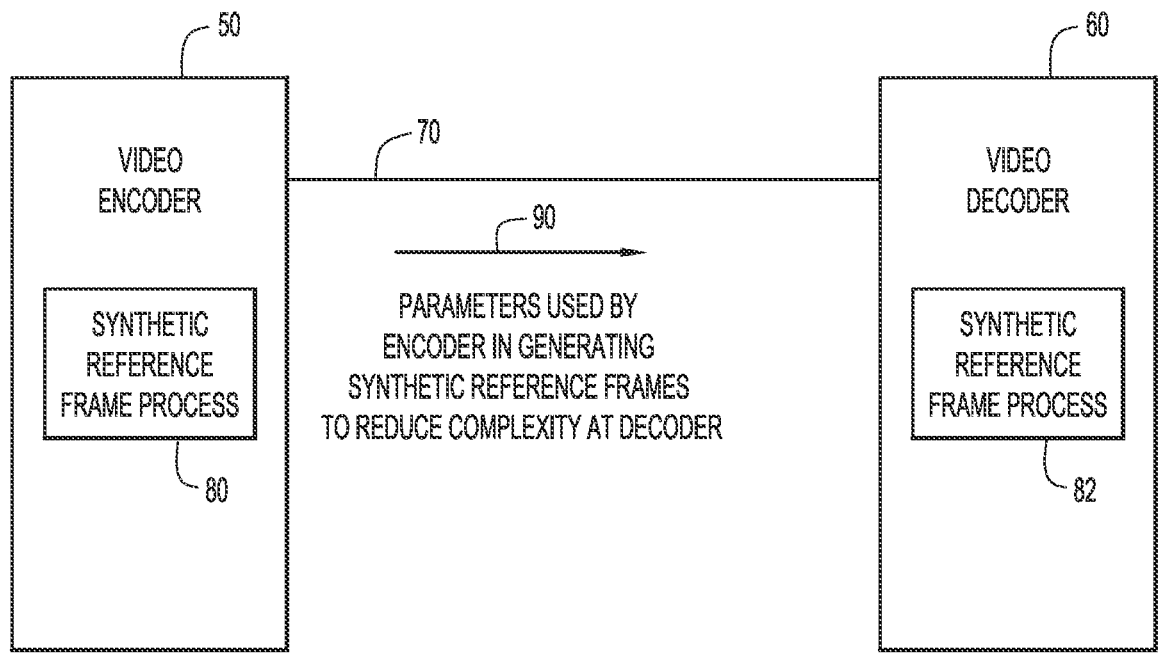
FIG. 6 is a block diagram showing a video encoder and a video decoder, both of which perform the synthetic reference frame generation process presented herein, and where the encoder can send parameters to the decoder to reduce the complexity at the decoder, according to an example embodiment.

Reference is now made to FIG. 6. FIG. 6 shows a video encoder 50 and a video decoder 60 in communication with each other by way of a communication channel 70. The communication channel 70 can be any communication media now known or hereinafter developed, including wired (electrical or optical) or wireless. As shown in FIG. 6, both the video encoded 50 and video decoder 60 perform a synthetic reference frame process, as shown at reference numerals 80 and 82, respectively. Processes 80 and 82 involve performing operations as depicted in the flow chart of FIG. 5, and as described above in connection with FIGS. 1-4.

Furthermore, as shown at reference numeral 90, the encoder 50 may send to the decoder 60 parameters that the encoder used in generating synthetic reference frames by process 80 in order to reduce the complexity of process 82 performed at the decoder 60. For example, the video encoder 50 informs the video decoder 60 of a global motion vector, search ranges, skip threshold, number of searches lambda parameter used for motion estimation, block sizes used at the encoder, limit of the number of matches on an entire frame or regions of a frame, on a sliding window basis, etc. The goal of the encoder 50 informing the decoder 60 about these parameters is to have the decoder do less work (and the encoder do more work). This enables the reduction of complexity at the decoder, which in many video distribution applications, is very important.

It is also possible that motion searching is done one block at a time, not all at once, so that some guide vectors in the motion search could be vectors already transmitted from the encoder to the decoder in the encoded bit-stream sent by the encoder. In other words, it is not necessary that motion estimation be done entirely at once up front.

Figure 7:
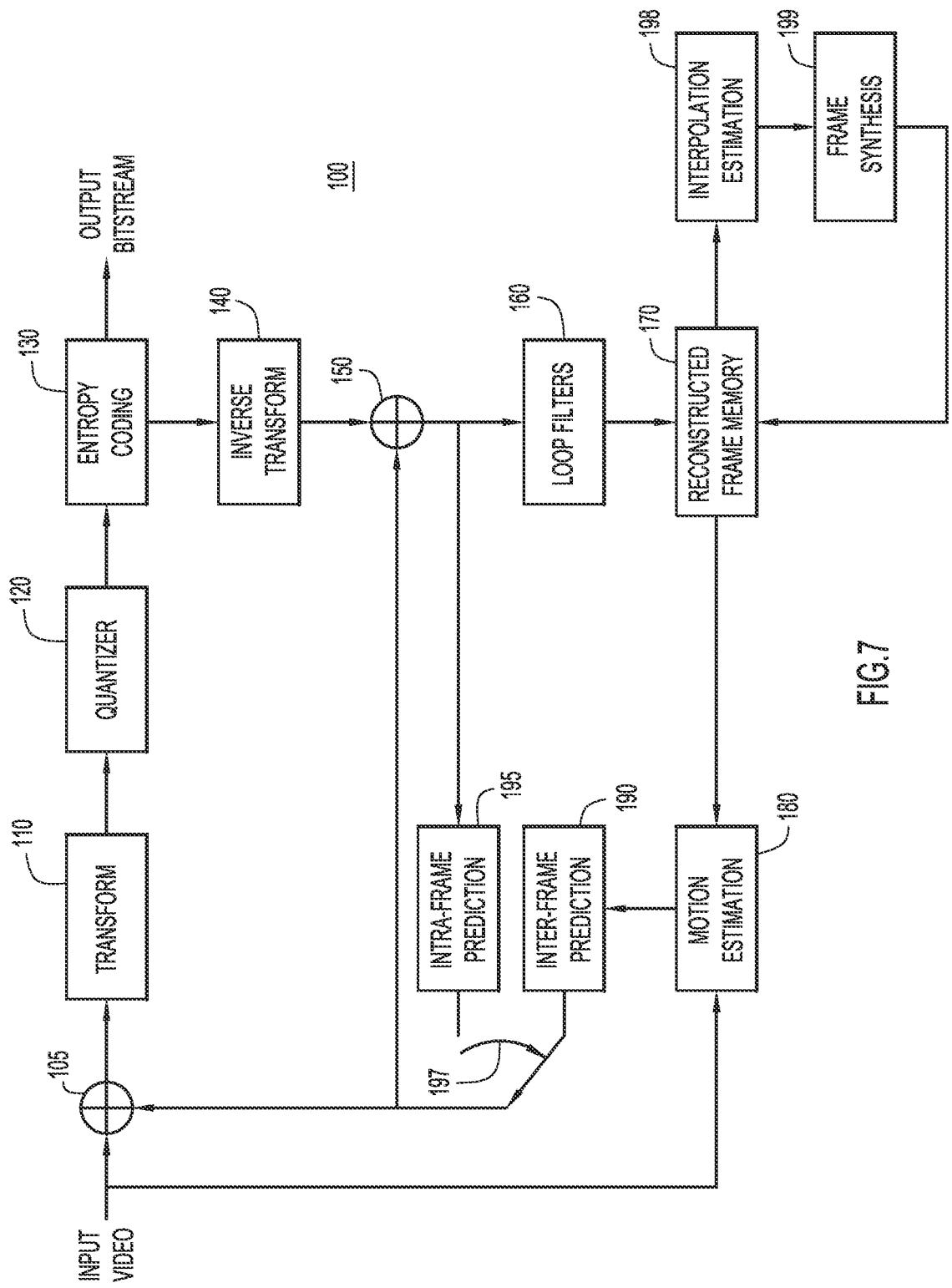
FIG. 7 is a block diagram of a video encoder configured to perform the motion estimation and reference frame synthesis process presented herein, according to an example embodiment.

Referring first to FIG. 7, a block diagram of a video encoder is shown at reference numeral 100. The video encoder 100 is configured to perform the motion estimation techniques presented herein. The video encoder 100 includes a subtractor 105, a transform unit 110, a quantizer unit 120, an entropy coding unit 130, an inverse transform unit 140, an adder 150, one or more loop filters 160, a reconstructed frame memory 170, a conventional motion estimation unit 180, an interpolation motion estimator 198, a frame synthesis unit 199, an inter-frame prediction unit 190, an intra-frame prediction unit 195 and a switch 197.

A current frame (input video) as well as a prediction frame are input to a subtractor 105. The subtractor 105 is provided with input from either the inter-frame prediction unit 190 or intra-frame prediction unit 195, the selection of which is controlled by switch 197. Intra-prediction processing is selected for finding similarities within the current image frame, and is thus referred to as "intra" prediction. Motion compensation has a temporal component and thus involves analysis between successive frames that is referred to as "inter" prediction. The motion estimation unit 180 supplies a motion estimation output as input to the inter-frame prediction unit 190. The motion estimation unit 180 receives as input the input video and an output of the reconstructed frame memory 170. The interpolation estimation unit 198 performs the motion estimation operations described herein using reference frames from the reconstructed frame memory. The output of the interpolation estimation unit is passed to the frame synthesis unit 199 which creates a new reference frame using the motion compensation methods described herein, which is added to the reconstructed frame memory 170. Both original and synthetic reference frames in the reconstructed frame memory 170 are available to the motion estimation unit 180 and hence the inter-frame prediction unit 190.

The subtractor 105 subtracts the output of the switch 197 from the pixels of the current frame, prior to being subjected to a two dimensional transform process by the transform unit 110 to produce transform coefficients. The transform coefficients are then subjected to quantization by quantizer unit 120 and then supplied to entropy coding unit 130. Entropy coding unit 130 applies entropy encoding in order to remove redundancies without losing information, and is referred to as a lossless encoding process. Subsequently, the encoded data is arranged in network packets via a packetizer (not shown), prior to be transmitted in an output bit stream.

The output of the quantizer unit 120 is also applied to the inverse transform unit 140 and used for assisting in prediction processing. The adder 150 adds the output of the inverse transform unit 140 and an output of the switch 197 (either the output of the inter-frame prediction unit 190 or the intra-frame prediction unit 195). The output of the adder 150 is supplied to the input of the intra-frame prediction unit 195 and to one or more loop filters 160 which suppress some of the sharpness in the edges to improve clarity and better support prediction processing. The output of the loop filters 160 is applied to a reconstructed frame memory 170 that holds the processed image pixel data in memory for use in subsequent motion processing by motion estimation block 180.

Figure 8:
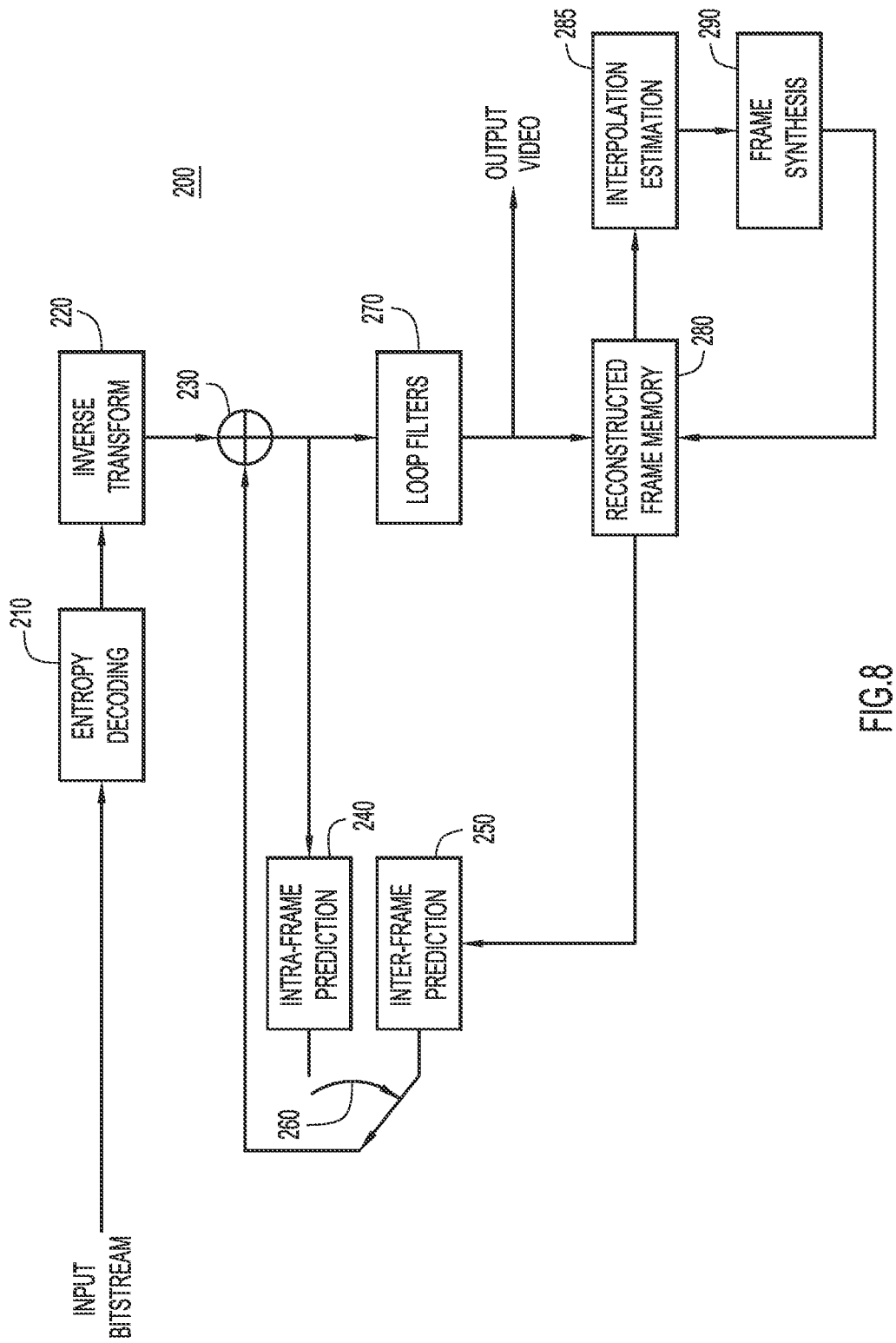
FIG. 8 is a block diagram of a video decoder configured to perform the motion estimation and reference frame synthesis process presented herein, according to an example embodiment.

Turning to FIG. 8, a block diagram of a video decoder is shown at reference numeral 200. The video decoder 200 includes an entropy decoding unit 210, an inverse transform unit 220, an adder 230, an intra-frame prediction unit 240, an inter-frame prediction unit 250, a switch 260, one or more loop filters 270, an interpolation estimation unit 280 and a frame synthesis unit 290, and a reconstructed frame memory 280. The entropy decoding unit 210 performs entropy decoding on the received input bitstream to produce quantized transform coefficients which are applied to the inverse transform unit 220. The inverse transform unit 220 applies two-dimensional inverse transformation on the quantized transform coefficients to output a quantized version of the difference samples. The output of the inverse transform unit 220 is applied to the adder 230. The adder 230 adds to the output of the inverse transform unit 220 an output of either the intra-frame prediction unit 240 or inter-frame prediction unit 250. The loop filters 270 operate similar to that of the loop filters 160 in the video encoder 100 of FIG. 3. An output video image is taken at the output of the loop filters 270. When signaled as a reference frame, video images are stored in the reconstructed frame memory 280. The interpolation estimation unit 285 performs the motion estimation operations described herein using reference frames from the reconstructed frame memory 280. The output of the interpolation estimation unit is passed to the frame synthesis unit 290 which creates a new reference frame using the motion compensation methods described herein, which is added to the reconstructed frame memory 280. Both original and synthetic reference frames in the reconstructed frame memory 280 are available to the interframe prediction unit 250.

The operations of the interpolation estimation units 198 and 285 are similar, and the operation of the frame synthesis units 199 and 290 are similar so that identical reference frames are synthesized for the reconstructed frame memories 170 and 280 given identical inputs to the respective encoder and decoder processes.

The video encoder 100 of FIG. 7 and the video decoder 200 of FIG. 8 may be implemented by digital logic gates in an integrated circuit (e.g., by an application specific integrated circuit) or by two or more separate logic devices. Alternatively, the video encoder 100 and video decoder 200 may be implemented by software executed by one or more processors, as described further in connection with FIG. 9, below.

Each of the functional blocks in FIGS. 7 and 8 are executed for each coding block, prediction block, or transform block.

Figure 9:
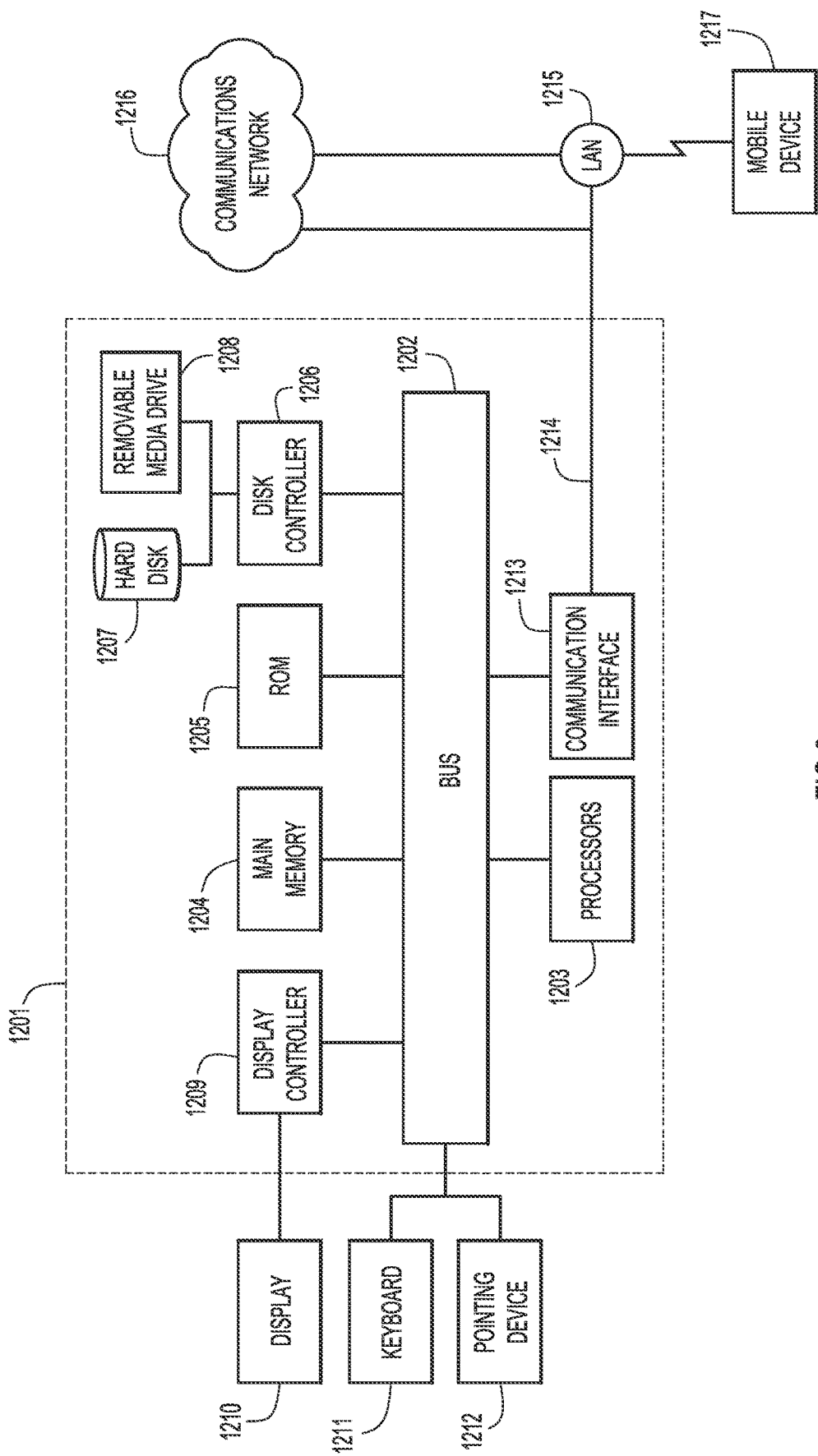
FIG. 9 is a block diagram of a computing system in which the video encoding and/or video decoding operations may be performed, according to an example embodiment.

FIG. 9 illustrates a computer system 1201 upon which an embodiment of the techniques presented herein may be implemented. The computer system 1201 may be programmed to implement a computer based device, such as a video conferencing endpoint or any device includes a video encoder or decoder for processing real time video images. The computer system 1201 includes a bus 1202 or other communication mechanism for communicating information, and a processor 1203 coupled with the bus 1202 for processing the information. While the figure shows a signal block 1203 for a processor, it should be understood that the processors 1203 represent a plurality of processing cores, each of which can perform separate processing. The computer system 1201 also includes a main memory 1204, such as a random access memory (RAM) or other dynamic storage device (e.g., dynamic RAM (DRAM), static RAM (SRAM), and synchronous DRAM (SD RAM)), coupled to the bus 1202 for storing information and instructions to be executed by processor 1203. In addition, the main memory 1204 may be used for storing temporary variables or other intermediate information during the execution of instructions by the processor 1203.

The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 1201 may also include a display controller 1209 coupled to the bus 1202 to control a display 1210, such as a cathode ray tube (CRT), for displaying information to a computer user. The computer system 1201 includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps of the techniques presented herein in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 1201, for driving a device or devices for implementing the invention, and for enabling the computer system 1201 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a wired or wireless network interface card to attach to any packet switched (wired or wireless) LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local are network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc.). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

In summary, a low-complexity method is provided for creating synthetic reference frames, using suitable for implementation in real-time software-based and hardware-based video coding. It may use a simple SAD-matching process combined with hierarchical motion estimation and merging, and includes techniques for enforcing bounded complexity.

The method has several features. It uses pixel-accurate only motion compensation—no subpixel interpolation is required. SAD-only matching may be used, which is easy to implement using widely available Single Instruction Multiple Data (SIMD) methods. Hierarchical motion estimation may be used with a simple (½,½) downsampling filter at each level and very restricted search ranges. A skip condition is provided to avoid a bulk of motion search overhead. Bounded complexity is achieved per frame, per region or per block, suitable for hardware implementation. Modifications to encoding and decoding processes can be made to optimize coding in order to reflect the presence of an interpolated reference in the reference picture list.

In software the process is fast, as the average number of matches required for a block tends to be small. However, worst-case complexity can be managed, especially for hardware.

Complexity results from the number of matches and also from how widely distributed the motion vectors are, as this increases memory bandwidth. So additionally there are some restrictions which can be placed to limit the complexity, especially for a decoder:

A) a higher skip threshold can be signalled by an encoder;
B) a vertical limit can be placed on each motion vector; and
C) a budget on the number of matches per block, per block row, per region or per frame can be enforced.

Coding Using the Interpolated Reference Frame

Using the interpolated reference frame affects coding. Typically, the proportion of skip blocks increases, and the proportion of bi-predicted blocks decreases. The additional skip blocks tend to use unidirectional prediction with this new reference frame, and the additional skip blocks substitute for conventional bi-predicted blocks. In other words, interpolating the reference frame substitutes for an interpolated prediction being formed from the original reference frames. The interpolated reference frame is rarely used as one reference for a bi-predicted block.

Coding gains from this method can therefore be increased by optimizing the reference picture list for each mode. The interpolated reference can be excluded from being used in a bi-predicted mode, and it can be used as the first reference in the reference list used for un-predicted modes and skip modes. When an interpolated reference is present, the order of codewords describing modes can be adjusted to reflect the increased likelihood of skip.

Coding Gains

In reordered coding scenarios (e.g. for streaming or television applications), this interpolated reference frame method gives around 6% bitrate savings across a wide quantization parameter (QP) range, and around 11% savings for a high QP (low bitrate) range.

The SAD-matching approach is easy to implement in SIMD. True motion approaches such as optical flow are very high complexity, and require motion vectors per pixel. Pixel-accurate motion vectors do not give the best interpolation if the interpolated frame were to be viewed directly, but still give very high performance when used to create a new reference frame that is not going to be viewed directly, but instead only used for prediction. When applied to a video codec, approximately 6-11% bitrate savings can be gained, on average.

In summary, in one form, a method is provided comprising: obtaining at least a first reference frame and a second reference frame of a video signal; generating a synthetic reference frame from the first reference frame and the second reference frame by: dividing the synthetic reference frame into a plurality of blocks; searching for motion vectors in the first reference frame and the second reference frame for each of the plurality of blocks in the synthetic reference frame; deriving motion vector information for each of the plurality of blocks in the synthetic reference frame from motion vectors identified in each of the first reference frame and the second reference frame; identifying reference blocks in each of the first reference frame and the second reference frame using the motion vector information for each of the plurality of blocks in the synthetic reference frame; and combining reference blocks from each of the first reference frame and the second reference frame to derive an interpolated block of the synthetic reference frame.

In another form, an apparatus is provided comprising: a communication interface unit configured to enable communications over a communication channel; a processor configured to: obtain at least first and second reference frames of a video signal; and generate a synthetic reference frame from the first reference frame and the second reference frame by: dividing the synthetic reference frame into a plurality of blocks; searching for motion vectors in the first reference frame and the second reference frame for each of the plurality of blocks in the synthetic reference frame; deriving motion vector information for each of the plurality of blocks in the synthetic reference frame from motion vectors identified in each of the first reference frame and the second reference frame; identifying reference blocks in each of the first reference frame and the second reference frame using the motion vector information for each of the plurality of blocks in the synthetic reference frame; and combining reference blocks from each of the first reference frame and the second reference frame to derive an interpolated block of the synthetic reference frame.

In still another form, one or more non-transitory computer readable storage media encoded with software comprising computer executable instructions and when the software is executed operable to perform operations comprising: obtaining at least first and second reference frames of a video signal; and generating a synthetic reference frame from the first reference frame and the second reference frame by: dividing the synthetic reference frame into a plurality of blocks; searching for motion vectors in the first reference frame and the second reference frame for each of the plurality of blocks in the synthetic reference frame; deriving motion vector information for each of the plurality of blocks in the synthetic reference frame from motion vectors identified in each of the first reference frame and the second reference frame; identifying reference blocks in each of the first reference frame and the second reference frame using the motion vector information for each of the plurality of blocks in the synthetic reference frame; and combining reference blocks from each of the first reference frame and the second reference frame to derive an interpolated block of the synthetic reference frame.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   obtaining at least a first reference frame and a second reference frame of a video signal;
   generating a synthetic reference frame from the first reference frame and the second reference frame, wherein a temporal position of the synthetic reference frame with respect to the first reference frame and the second reference frame is determined by integer weights that are proportional to a distance between the synthetic reference frame and the first reference frame and the second reference frame, respectively, such that a temporally nearer reference frame has a larger weight, by:
   dividing the synthetic reference frame into a plurality of blocks, and further dividing the plurality of blocks into a plurality of sub-blocks;
   searching for motion vectors in the first reference frame and the second reference frame for each of the plurality of blocks in the synthetic reference frame, wherein the searching comprises:
   determining that motion estimation cannot be bypassed;
   in response to determining that the motion estimation cannot be bypassed, for each of the plurality of blocks in raster order, determining candidate motion vectors from lower layer blocks and from neighbor blocks; and
   identifying, for each sub-block, a primary motion vector in a farther one of the first reference frame and the second reference frame;
   deriving motion vector information for each of the plurality of blocks in the synthetic reference frame from motion vectors identified in each of the first reference frame and the second reference frame, including deriving a secondary motion vector in a nearer one of the first reference frame and the second reference frame from the primary motion vector by scaling the primary motion vector to an appropriate scale, wherein the primary motion vector is determined to pixel accuracy and the secondary motion vector is rounded to achieve a same level of accuracy as the primary motion vector;

identifying reference blocks in each of the first reference frame and the second reference frame using the motion vector information for each of the plurality of blocks in the synthetic reference frame; and combining the reference blocks from each of the first reference frame and the second reference frame to derive an interpolated block of the synthetic reference frame; and performing the motion estimation using the synthetic reference frame.

2. The method of claim 1, wherein the searching further comprises:

matching a block or sub-block in the farther one of the first reference frame and the second reference frame obtained by displacing a corresponding block or sub-block from the synthetic reference frame by the primary motion vector, with a block or sub-block in the nearer one of the first reference frame and the second reference frame obtained by displacing the corresponding block or sub-block from the synthetic reference frame by the secondary motion vector; and performing hierarchical motion estimation at multiple scales starting with smaller blocks using motion vector information at resolution layer n for motion vector information derivation at next larger resolution layer n+1.

3. The method of claim 2, further comprising:

scaling down the first reference frame and the second reference frame R0 and R1, respectively, by a factor of ½ vertically and horizontally to form reference frames R0(n), R1(n) of size width/$2^n$×height/$2^n$, wherein motion vectors from a lower layer when scaled by a factor of two are available as motion vector candidates for a next higher layer, as well as motion vectors from spatial neighbors at the same layer, and wherein block sizes are the same at each layer, so that each block at layer n+1 corresponds to four blocks in layer n, and wherein determining that the motion estimation cannot be bypassed comprises:

for a given block, computing a skip vector from neighboring blocks or a default value; and determining that the skip vector is not valid based on a value computed for each sub-block of the given block.

4. The method of claim 2, wherein for a given block, candidates for motion vector search include spatial neighbors above and to a left of the given block and specific sets of guide motion vector arrays at co-located positions, below the given block and to a right of the given block, wherein a main guide motion vector array is an array of motion data formed from performing the motion estimation at a next smaller size in the hierarchical motion estimation.

5. The method of claim 1, wherein the scaling comprises using first and second weights in computing the secondary motion vector from the primary motion vector, and wherein the first and second weights are equal or unequal.

6. The method of claim 1, wherein the obtaining and the generating are separately performed at each of an encoder and a decoder, the method further comprising:

transmitting from the encoder to the decoder one or more parameters for the decoder to use in performing the generating of the synthetic reference frame, wherein the one or more parameters include: a global motion vector, motion vector search ranges and a number of searches, a skip threshold to determine when to bypass the motion estimation, and a size of the blocks.

7. The method of claim 1, wherein the combining comprises averaging the reference blocks from each of the first reference frame and the second reference frame, and wherein the averaging comprises an unweighted averaging or a weighted averaging.

8. An apparatus comprising:

a communication interface unit configured to enable communications over a communication channel; and one or more processors configured to:

obtain at least a first reference frame and a second reference frame of a video signal;

generate a synthetic reference frame from the first reference frame and the second reference frame, wherein a temporal position of the synthetic reference frame with respect to the first reference frame and the second reference frame is determined by integer weights that are proportional to a distance between the synthetic reference frame and the first reference frame and the second reference frame, respectively, such that a temporally nearer reference frame has a larger weight, by:

dividing the synthetic reference frame into a plurality of blocks, and further dividing the plurality of blocks into a plurality of sub-blocks;

searching for motion vectors in the first reference frame and the second reference frame for each of the plurality of blocks in the synthetic reference frame, wherein the searching comprises:

determining that motion estimation cannot be bypassed;

in response to determining that the motion estimation cannot be bypassed, for each of the plurality of blocks in raster order, determining candidate motion vectors from lower layer blocks and from neighbor blocks; and identifying, for each sub-block, a primary motion vector in a farther one of the first reference frame and the second reference frame;

deriving motion vector information for each of the plurality of blocks in the synthetic reference frame from motion vectors identified in each of the first reference frame and the second reference frame, including deriving a secondary motion vector in a nearer one of the first reference frame and the second reference frame from the primary motion vector by scaling the primary motion vector to an appropriate scale, wherein the primary motion vector is determined to pixel accuracy and the secondary motion vector is rounded to achieve a same level of accuracy as the primary motion vector;

identifying reference blocks in each of the first reference frame and the second reference frame using the motion vector information for each of the plurality of blocks in the synthetic reference frame; and combining the reference blocks from each of the first reference frame and the second reference frame to derive an interpolated block of the synthetic reference frame; and perform the motion estimation using the synthetic reference frame.

9. The apparatus of claim 8, wherein the searching further comprises:
matching a block or sub-block in the farther one of the first reference frame and the second reference frame obtained by displacing a corresponding block or sub-block from the synthetic reference frame by the primary motion vector, with a block or sub-block in the nearer one of the first reference frame and the second reference frame obtained by displacing the corresponding block or sub-block from the synthetic reference frame by the secondary motion vector; and
performing hierarchical motion estimation at multiple scales starting with smaller blocks using motion vector information at resolution layer n for motion vector information derivation at next larger resolution layer n+1.

10. The apparatus of claim 9, wherein the one or more processors are further configured to:
scale down the first reference frame and the second reference frame R0 and R1, respectively, by a factor of ½ vertically and horizontally to form reference frames R0(n), R1(n) of size width/$2^n$×height/$2^n$, wherein motion vectors from a lower layer when scaled by a factor of two are available as motion vector candidates for a next higher layer, as well as motion vectors from spatial neighbors at the same layer, and wherein block sizes are the same at each layer, so that each block at layer n+1 corresponds to four blocks in layer n, and wherein determining that the motion estimation cannot be bypassed comprises:
for a given block, computing a skip vector from neighboring blocks or a default value; and
determining that the skip vector is not valid based on a value computed for each sub-block of the given block.

11. The apparatus of claim 9, wherein for a given block, candidates for motion vector search include spatial neighbors above and to a left of the given block and specific sets of guide motion vector arrays at co-located positions, below the given block and to a right of the given block, wherein a main guide motion vector array is an array of motion data formed from performing the motion estimation at a next smaller size in the hierarchical motion estimation.

12. The apparatus of claim 8, wherein the scaling comprises using first and second weights in computing the secondary motion vector from the primary motion vector, and wherein the first and second weights are equal or unequal.

13. The apparatus of claim 8, wherein the one or more processors are configured to obtain and generate separately at each of an encoder and a decoder, and wherein the one or more processors are configured to:
transmit from the encoder to the decoder one or more parameters for the decoder to use in generating the synthetic reference frame, wherein the one or more parameters include: a global motion vector, motion vector search ranges and a number of searches, a skip threshold to determine when to bypass the motion estimation, and a size of the blocks.

14. The apparatus of claim 8, wherein the combining comprises averaging the reference blocks from each of the first reference frame and the second reference frame, and wherein the averaging comprises an unweighted averaging or a weighted averaging.

15. One or more non-transitory computer readable storage media encoded with instructions that, when executed by one or more processors, cause the one or more processors to:
obtain at least a first reference frame and a second reference frame of a video signal;
generate a synthetic reference frame from the first reference frame and the second reference frame, wherein a temporal position of the synthetic reference frame with respect to the first reference frame and the second reference frame is determined by integer weights that are proportional to a distance between the synthetic reference frame and the first reference frame and the second reference frame, respectively, such that a temporally nearer reference frame has a larger weight, by:
dividing the synthetic reference frame into a plurality of blocks, and further dividing the plurality of blocks into a plurality of sub-blocks;
searching for motion vectors in the first reference frame and the second reference frame for each of the plurality of blocks in the synthetic reference frame, wherein the searching comprises:
determining that motion estimation cannot be bypassed;
in response to determining that the motion estimation cannot be bypassed, for each of the plurality of blocks in raster order, determining candidate motion vectors from lower layer blocks and from neighbor blocks; and
identifying, for each sub-block, a primary motion vector in a farther one of the first reference frame and the second reference frame;
deriving motion vector information for each of the plurality of blocks in the synthetic reference frame from motion vectors identified in each of the first reference frame and the second reference frame, including deriving a secondary motion vector in a nearer one of the first reference frame and the second reference frame from the primary motion vector by scaling the primary motion vector to an appropriate scale, wherein the primary motion vector is determined to pixel accuracy and the secondary motion vector is rounded to achieve a same level of accuracy as the primary motion vector;
identifying reference blocks in each of the first reference frame and the second reference frame using the motion vector information for each of the plurality of blocks in the synthetic reference frame; and
combining the reference blocks from each of the first reference frame and the second reference frame to derive an interpolated block of the synthetic reference frame; and
perform the motion estimation using the synthetic reference frame.

16. The one or more non-transitory computer readable storage media of claim 15, wherein the searching further comprises:
matching a block or sub-block in the farther one of the first reference frame and the second reference frame obtained by displacing a corresponding block or sub-block from the synthetic reference frame by the primary motion vector, with a block or sub-block in the nearer one of the first reference frame and the second reference frame obtained by displacing the corresponding block or sub-block from the synthetic reference frame by the secondary motion vector; and
performing hierarchical motion estimation at multiple scales starting with smaller blocks using motion vector information at resolution layer n for motion vector information derivation at next larger resolution layer n+1.

17. The one or more non-transitory computer readable storage media of claim 16, wherein the instructions further cause the one or more processors to:
  scale down the first reference frame and the second reference frame R0 and R1, respectively, by a factor of ½ vertically and horizontally to form reference frames R0(n), R1(n) of size width/$2^n$×height/$2^n$, wherein motion vectors from a lower layer when scaled by a factor of two are available as motion vector candidates for a next higher layer, as well as motion vectors from spatial neighbors at the same layer, and wherein block sizes are the same at each layer, so that each block at layer n+1 corresponds to four blocks in layer n, and wherein determining that the motion estimation cannot be bypassed comprises:
  for a given block, computing a skip vector from neighboring blocks or a default value; and
  determining that the skip vector is not valid based on a value computed for each sub-block of the given block.

18. The one or more non-transitory computer readable storage media of claim 16, wherein for a given block, candidates for motion vector search include spatial neighbors above and to a left of the given block and specific sets of guide motion vector arrays at co-located positions, below the given block and to a right of the given block, wherein a main guide motion vector array is an array of motion data formed from performing the motion estimation at a next smaller size in the hierarchical motion estimation.

19. The one or more non-transitory computer readable storage media of claim 15, wherein the scaling comprises using first and second weights in computing the secondary motion vector from the primary motion vector, and wherein the first and second weights are equal or unequal.

20. The one or more non-transitory computer readable storage media of claim 15, wherein the instructions cause the one or more processors to obtain and generate separately at each of an encoder and a decoder, and wherein the instructions further cause the one or more processors to:
  transmit from the encoder to the decoder one or more parameters for the decoder to use in generating the synthetic reference frame, wherein the one or more parameters include: a global motion vector, motion vector search ranges and a number of searches, a skip threshold to determine when to bypass the motion estimation, and a size of the blocks.

* * * * *